(12) United States Patent
Anand et al.

(10) Patent No.: US 10,002,254 B2
(45) Date of Patent: Jun. 19, 2018

(54) SYSTEMS AND METHODS FOR SQL TYPE EVALUATION TO DETECT EVALUATION FLAWS

(71) Applicant: Prevoty, Inc., Los Angeles, CA (US)

(72) Inventors: Kunal Anand, Marina Del Rey, CA (US); Michael Crampon, Edmonds, WA (US); Richard Meester, Camarillo, CA (US); Joseph Rozner, Northridge, CA (US); Joshua Chase, Los Angeles, CA (US)

(73) Assignee: PREVOTY, INC., Los Angeles, CA (US)

( * ) Notice: Subject to any disclaimer, the term of this patent is extended or adjusted under 35 U.S.C. 154(b) by 0 days. days.

(21) Appl. No.: 15/268,503

(22) Filed: Sep. 16, 2016

(65) Prior Publication Data

US 2017/0068819 A1    Mar. 9, 2017

Related U.S. Application Data

(63) Continuation-in-part of application No. 14/599,978, filed on Jan. 19, 2015, now Pat. No. 9,519,774.
(Continued)

(51) Int. Cl.
G06F 21/57     (2013.01)
G06F 21/56     (2013.01)
(Continued)

(52) U.S. Cl.
CPC ........ *G06F 21/577* (2013.01); *G06F 17/3051* (2013.01); *G06F 17/30371* (2013.01);
(Continued)

(58) Field of Classification Search
CPC ...... G06F 21/52; G06F 21/566; G06F 21/577; H04L 63/14
See application file for complete search history.

(56) References Cited

U.S. PATENT DOCUMENTS 5,742,806 A  *  4/1998  Reiner .............. G06F 17/30445
7,437,362 B1     10/2008  Ben-Natan
(Continued)

OTHER PUBLICATIONS

Halfond et al., AMNESIA: Analysis and Monitoring for NEutralizing SQL-Injection Attacks; IEEE, 10pages.*
(Continued)

*Primary Examiner* — Dao Q Ho
(74) *Attorney, Agent, or Firm* — Kang S. Lim

(57) ABSTRACT

Methods and apparatuses for detecting an evaluation flaw in a SQL query, the SQL query configured to access data in a database table are disclosed. The method includes creating a parse tree from the SQL query and evaluating the parse tree to ascertain whether a condition of the SQL query results in a type or value that is independent of contents of the database table. For type evaluation, if, responsive to the evaluating, the condition is found, designating the SQL query at risk for having the tautology in the SQL query. For value evaluation, if, responsive to the evaluating, the condition is found, determining whether the condition is always true or whether the condition is always false; and if, responsive to the determining, the condition is found to be always true or always false, designating the SQL query at risk for having the evaluation flaw in the SQL query.

19 Claims, 14 Drawing Sheets

Related U.S. Application Data

(60) Provisional application No. 62/220,903, filed on Sep. 18, 2015, provisional application No. 61/929,474, filed on Jan. 20, 2014.

(51) Int. Cl.
   *G06F 17/30* (2006.01)
   *G06F 21/52* (2013.01)

(52) U.S. Cl.
   CPC ............ *G06F 21/52* (2013.01); *G06F 21/566* (2013.01); *G06F 2221/033* (2013.01); *G06F 2221/034* (2013.01)

(56) References Cited

U.S. PATENT DOCUMENTS

| | | | |
|---|---|---|---|
| 8,225,402 B1 * | 7/2012 | Averbuch | ................ H04L 63/14 717/141 |
| 2005/0203921 A1 | 9/2005 | Newman et al. | |
| 2006/0212438 A1 | 9/2006 | Ng | |
| 2007/0208693 A1 | 9/2007 | Chang et al. | |
| 2009/0049547 A1 | 2/2009 | Fan | |
| 2010/0094765 A1 | 4/2010 | Nandy | |
| 2010/0228693 A1 * | 9/2010 | Dawson | .............. G06F 17/2705 706/12 |
| 2011/0258704 A1 | 10/2011 | Ichnowski | |
| 2012/0192280 A1 | 7/2012 | Venkatakrishnan et al. | |
| 2015/0205951 A1 | 7/2015 | Anand et al. | |

OTHER PUBLICATIONS

USPTO, ISA/US, "Notification of Transmittal of the ISR and the Written Opinion of the International Searching Authority, or the Declaration," in application No. PCT/US15/12082, dated Apr. 24, 2015, 9 pages.

USPTO, ISA/US, "Notification of Transmittal of the ISR and the Written Opinion of the International Searching Authority, or the Declaration," in application No. PCT/US16/52387, dated Dec. 28, 2016, 10 pages.

Buehrer at el., "Using Parse Tree Validation to Prevent SQL injection Attacks". In: International Workshop on Software Engineering and Middleware, ACM Sep. 2005, entire document especially sections 2.3.1, 3.2, 3.3, 3.4, 6. 8 pages.

\* cited by examiner

SYSTEMS AND METHODS FOR SQL TYPE EVALUATION TO DETECT EVALUATION FLAWS

CROSS-REFERENCE TO RELATED APPLICATIONS

This non-provisional application claims the benefit of U.S. provisional application No. 62/220,903, filed Sep. 18, 2015, which application is incorporated herein in its entirety by this reference.

This non-provisional application also claims priority to and is a continuation-in-part of U.S. non-provisional application entitled "Systems and Methods for SQL Query Constraint Solving", filed Jan. 19, 2015 as U.S. application Ser. No. 14/599,978, recently allowed, which itself claims the benefit of U.S. provisional application No. 61/929,474, filed Jan. 20, 2014, of same title, all of which are hereby fully incorporated reference.

Additionally, this application is related to co-pending U.S. application Ser. No. 15/268,510, filed Sep. 16, 2016, entitled "Systems and Methods for SQL Value Evaluation to Detect Evaluation Flaws", which is incorporated by reference herein for all purposes.

BACKGROUND

The present invention relates to systems and methods for preventing malicious attacks on relational database management systems (RDBMS). In particular, the present systems and methods include novel means for determining the likelihood of a structured query language (SQL) injection attack and other security risks.

With the proliferation of online activity, there has been an equally robust increase in the numbers of attacks. These attacks enable malicious parties to gain personal (and potentially sensitive) information on individuals, redirect users to malicious websites, track their browsing, and otherwise take advantage of users, often without them being aware of the attack.

One common vector of attacks is SQL injection. SQL injection is designed to tamper or steal sensitive information from data-driven web applications. This is accomplished by providing fragments of a SQL query into an input variable, supplied by a web application user. When the input is evaluated by the application, the tainted SQL query is executed, allowing attackers to CRUD (create, read, update, delete) information from a database.

There are limited methods currently employed to avert SQL injection attacks. Rarely are there requirements placed on SQL entries that attempt to redress SQL injection attacks. More often blacklists, in the form of string replacements and regular expressions, are employed to restrict known threats from accessing the databases. However, generally, there is insufficient means for accurately assessing the risk of a SQL query and especially, an input variable that may contain a SQL query.

It is therefore apparent that an urgent need exists for improved systems and methods for analyzing SQL queries in order to identify potential injection attacks. Such systems and methods enable the generation of reports on the SQL query which may be employed for attack prevention.

SUMMARY

To achieve the foregoing and in accordance with the present invention, systems and methods for analyzing SQL queries for constraint violations, which may indicate injection attacks. Such systems and methods enable the identification and possibly prevention, of such attacks. This increases database security where employed.

In some embodiments, the systems and methods tokenizing a SQL query to generate a token stream. Next lexical nodes are generated by iterating over the token stream. Then a parse tree can be constructed by iterating over the lexical nodes. The parse tree may be compared to a SQL schema and access configuration for a database in order to analyze the SQL query for constraint violations.

The analyzing for constraint violations includes determining the number of queries in the parse tree. This may be performed by identifying multiple SQL statements, delineating by a query separator or identifying sub-queries in relevant query commands and operators.

Another constraint violation analyzed for is identifying invalid fields and table access. This is determined by identifying parse tree identifiers for fields or tables that do not exist or for which access is restricted. In a similar vein, identifying invalid field type comparisons and pattern matches may also be performed. This includes identifying where the field input mismatches the SQL query function, or where field are compared by the SQL query which are restricted from being compared by the access configuration.

Identifying early statement termination is another constraint violation which may be analyzed for. A report of all the constraint violations may be output. In other embodiments, remedial measures may be taken to reduce risk exposure for SQL queries that are likely harboring a SQL injection attack. It is also possible to analyze for the presence of a comment, which can be a possible early termination, a possible excising of standard query structure, or extraneous unused content present in the query. Possible early termination or possible excising of standard query structure may be thought of as attack vectors. Extraneous unused content may be thought of as resulting in inefficient, unneeded data transfer to the query engine.

Embodiments of the invention also pertain to detecting evaluation flaws (i.e., tautologies, contradictions, and coding inefficiencies). In one or more embodiments, the structure of the parse tree and a step-wise, bottom-up approach is employed to walk through the parse tree to detect types and to ascertain from those types whether the condition for SQL execution is static or dynamic. If the condition for SQL execution is static, the SQL statement is marked for further evaluation for possible evaluation flaws. In other embodiments, the structure of the parse tree and a step-wise, bottom-up approach is employed to walk through the parse tree to evaluate for values and to ascertain from those values whether the condition for SQL execution is always true or always false or a coding error. If the condition for SQL execution is always true, a tautology is said to exist. If the condition for SQL execution is always false, a contradiction is said to exist.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, some embodiments will now be described, by way of example, with reference to the accompanying drawings, in which.

DETAILED DESCRIPTION

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

Aspects, features and advantages of exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute and/or sequential terms, such as, for example, "will," "will not," "shall," "shall not," "must," "must not," "first," "initially," "next," "subsequently," "before," "after," "lastly," and "finally," are not meant to limit the scope of the present invention as the embodiments disclosed herein are merely exemplary.

The present invention relates to novel systems and methods for identifying and preventing attacks on databases via SQL injection. Unlike previous systems that utilize blacklists or other rudimentary means for restricting access to these databases, the present system utilizes a process for analyzing SQL queries in order to identify characteristics that indicate that the query may include an attack. The resulting reports of the SQL query may indicate the likelihood that the query is valid versus a potential security risk. These reports may be utilized to drive mitigation policies; which enables a higher degree of protection for databases.

Figure 1:
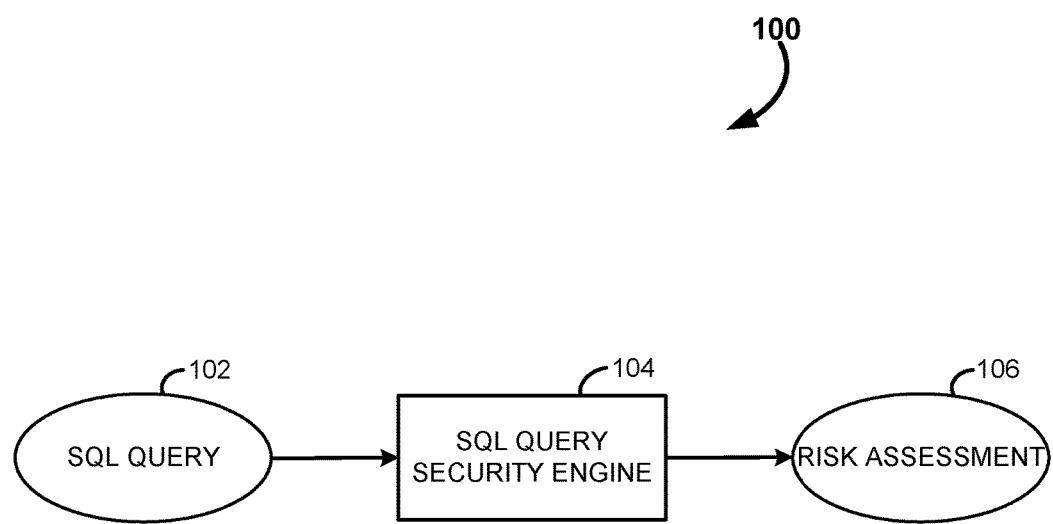
FIG. 1 is a schematic block diagram for the system for SQL query security, in association with some embodiments.

Turning to FIG. 1, shown generally at 100, the system includes an incoming SQL query 102 which is filtered through a SQL query security engine 104. The SQL query security engine 104 may analyze the SQL query 102 to determine the degree of risk of an injection attack the query poses. The output of the SQL query security engine 104 is a risk assessment report 106.

In some embodiments, this risk assessment may merely include a summary report of the security-specific analytics. The end-user/application may then utilize this assessment to apply their own policies regarding SQL risks, and implement a customized mitigation strategy.

In alternate embodiments, the SQL query security engine 104 may actively block the SQL query, or otherwise sterilize it, when particular risk profiles are reached. For example, if an SQL query includes a request to access multiple fields in a database table, and some of the indicated fields are restricted fields, the system may outright restrict the query, or only return the unrestricted data, dependent upon risk profiles and/or configuration of the risk mitigation.

Figure 2:
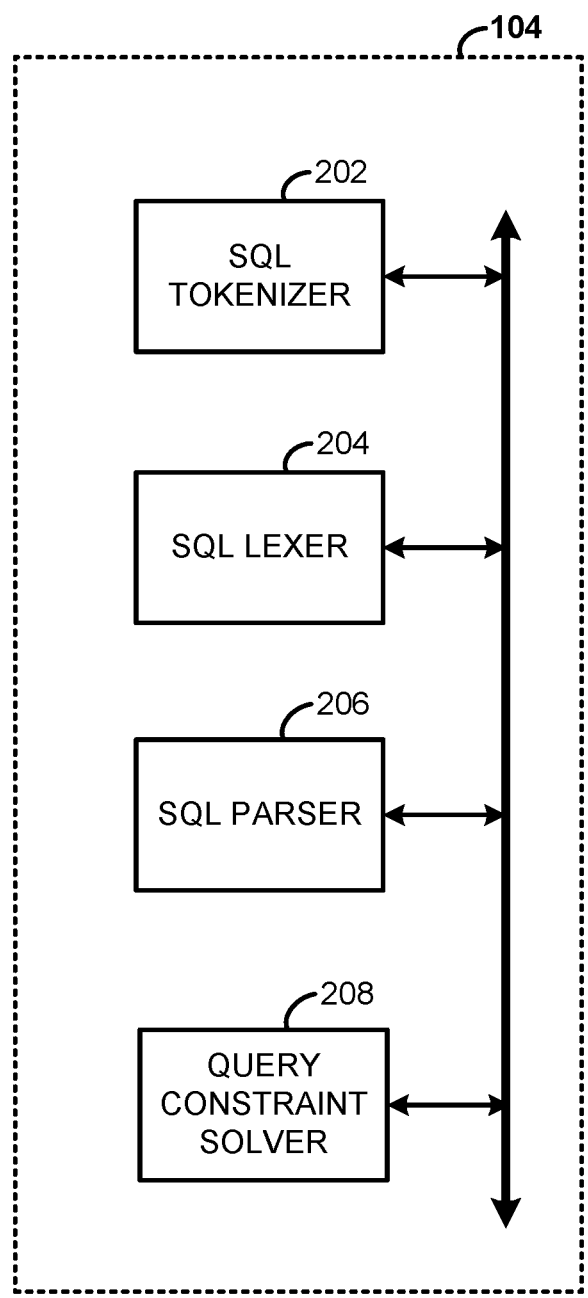
FIG. 2 is a more detailed schematic block diagram for the subcomponents of the SQL security system, in association with some embodiments.

FIG. 2 provides a more detailed view of the subcomponents of the SQL query security engine 104. These include a SQL tokenizer 202, a SQL lexer 204, a SQL parser 206, and a query constraint solver 208. Each of these components may be logically or physically coupled to one another.

In order for constraint solving to be performed, the SQL query must first be converted into a valid parse tree. The development of a valid parse tree is known, and may be accomplished in a number of ways. However, for the sake of this disclosure, one example of the construction of a parse tree will be provided for clarity.

An SQL query may be stand alone or may be within the context of another string. The SQL query is constructed as a sequence of bytes with a provided encoding (e.g., ASCII, Latin-1, or UTF-8). The encoding is needed for knowing how to tokenize the SQL query. The SQL tokenizer 202 consumes the byte sequence and produces a token stream. The token stream is a stream of characters, numbers and punctuation. More specifically, the token stream is an ordered stream of tokens, which are themselves composed of 0 or more characters, numbers, punctuation or symbols paired with their lexer-determined token type.

The SQL lexer 204 iterates over the token stream to produce a tree of lexical nodes. This process basically chunks the token stream into SQL commands, SQL functions and field/table identifiers, for example.

The SQL parser 206 iterates over the lexical nodes to determine query structure and validity (i.e., fits the rules for a valid SQL statement). This results in a parse tree. As previously mentioned, the generation of a parse tree from a SQL query is known, and as such description of these processes are left purposefully broad as to not over-clutter the disclosure with extraneous verbiage.

Once the parse tree is derived, however, the query constraint solver 208 may perform novel analysis on the SQL query to determine its risk profile. The query constraint solver 208 utilizes the parse tree as an input, and also utilizes a SQL schema, and an access configuration for the database as reference. The SQL schema includes a breakdown of the existing database tables with their corresponding fields and type information. The query constraint solver 208 compares the SQL query parse tree to the schema and access configurations to determine the number of queries, invalid field access, invalid field type comparisons, and early statement terminations. Each of these activities is an indicator of a SQL injection attack. The results of the analysis may be reported in raw form, or may be compared against risk profiles in order to generate a risk value for the query. In some cases, the risk value may be a simple 'high, medium, low' risk designation. In alternate embodiments, a percentile, or other indicator, may be provided for the query indicating its likelihood of harboring an injection attack. Although the schema and access configuration are not always required, their use allows for more detailed security reports to be generated.

Figure 3:
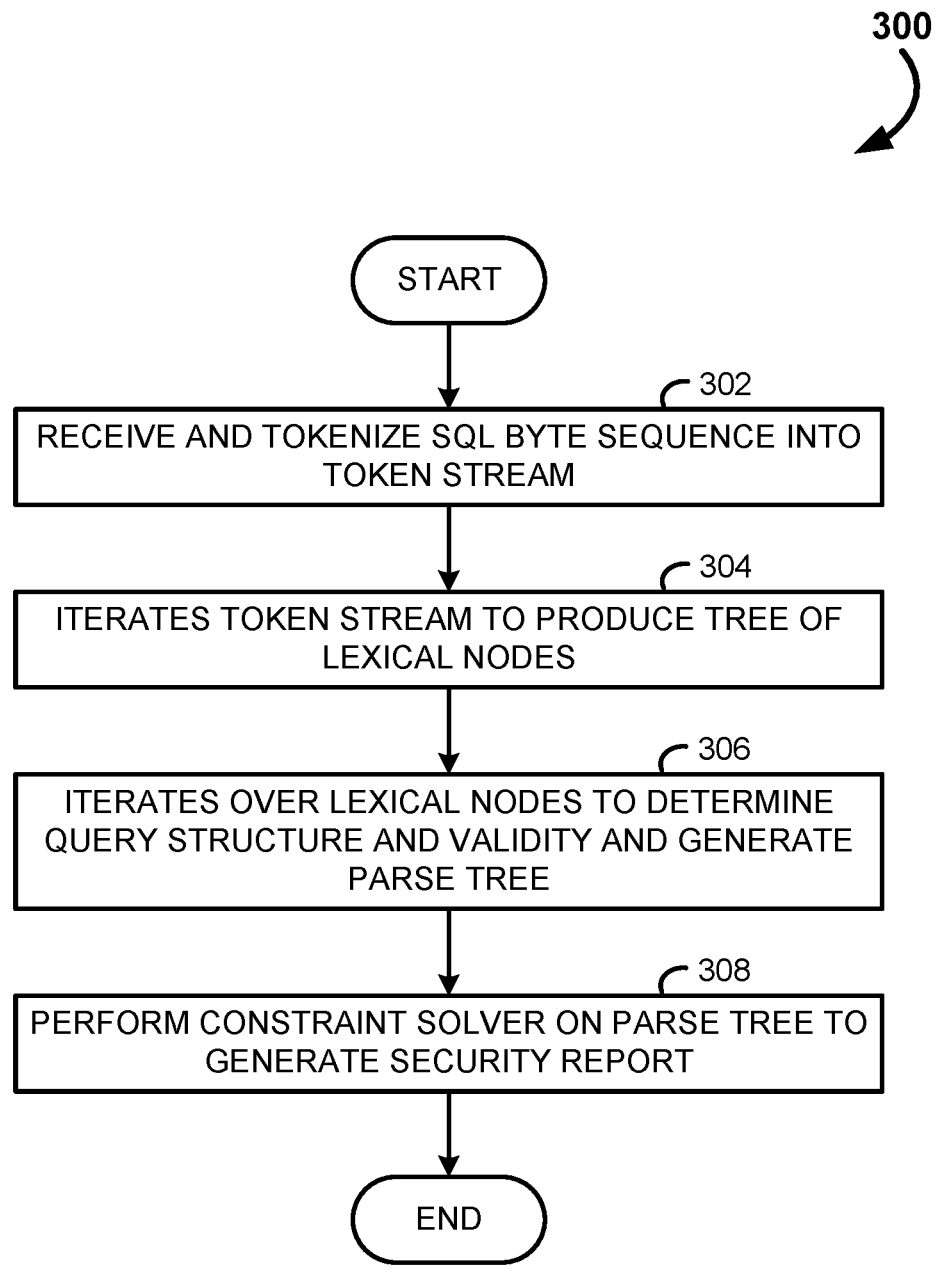
FIGS. 3 and 4 are example flow charts for the process of SQL query constraint solving, in accordance with some embodiments.

FIG. 3 provides an example flowchart, shown generally at 300, for the process of query constraint solving. As previously discussed, the first three steps prepare the SQL query for constraint analysis. These include receiving the SQL string and tokenizing it into a token stream (at 302), iterating over the token stream to generate lexical nodes (at 304), and parsing the lexical nodes to determine query structure and validity (at 306). These initial steps result in a parse tree which may be analyzed in the following step.

The parse tree is utilized for constraint solving (at 308). Constraint solving results in a security risk assessment, in some embodiments, where aspects of the query are simply reported out for action by the recipient. In other embodiments, the constraint solver may take additional risk mitigation steps, as previously mentioned. These additional steps may include designating likelihood of the SQL query including an injection attack, or even taking steps to minimize intrusion by detected SQL injection attempts (e.g., blocking access, altering SQL query to remove offending portions, etc.).

Figure 4:
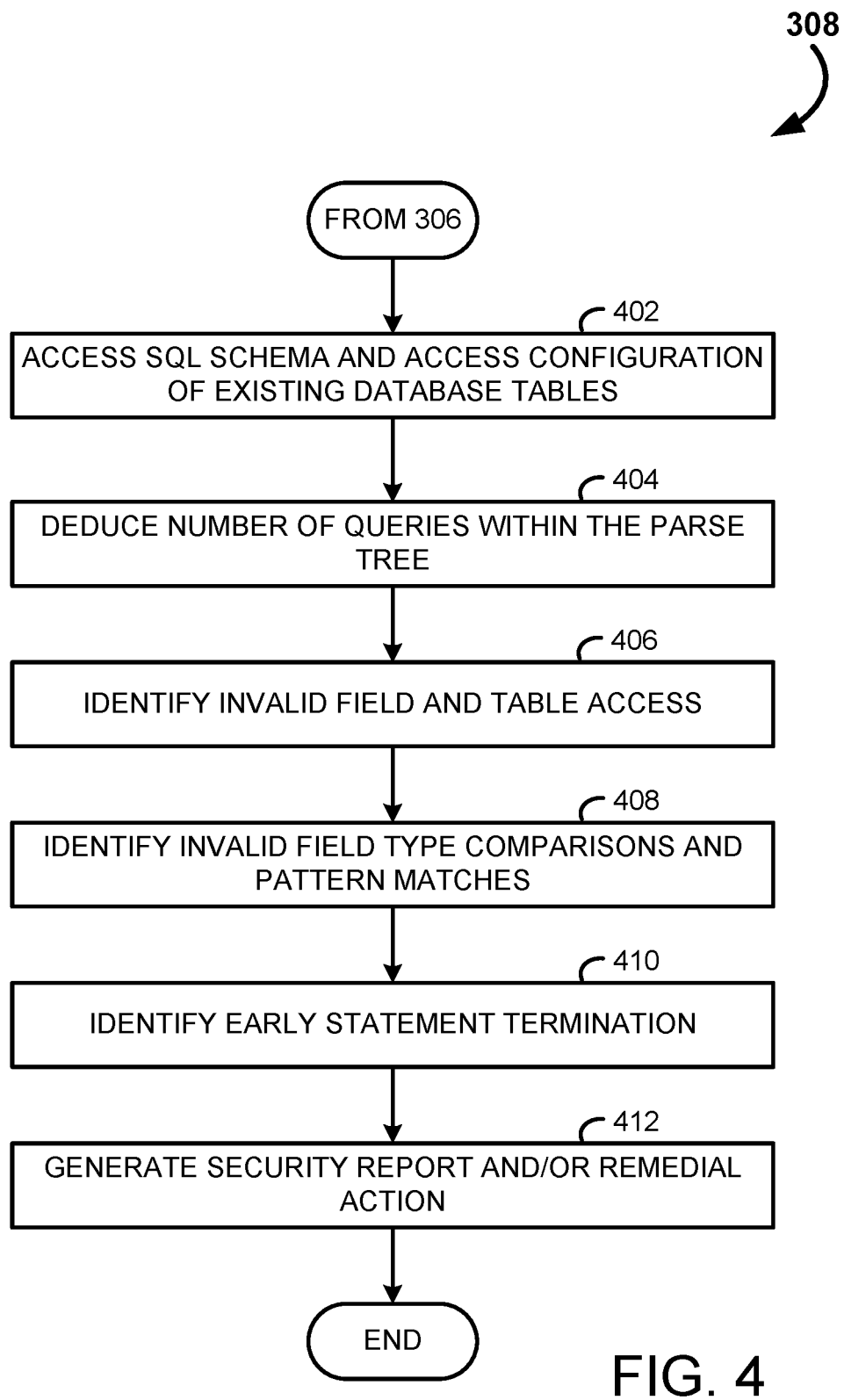

FIG. 4 provides a more detailed process of the constraint solver. This process starts by accessing (at 402) the SQL schema and access configuration, as described previously. The process then proceeds to compare the parse tree to these constraints. This enables the system to identify number of queries within the parse tree (at 404). This may include identifying query separators (such as semicolons) or subqueries (such as table joins and nested selections).

Next, invalid field and table access attempts are identified (at 406). This analysis is performed by matching the parse tree field/table identifiers against the access configurations and database schema. If the parse tree is attempting to access a field that does not exist, or to which there is restricted access, the query may be flagged as including an invalid access.

Likewise, invalid field type comparisons and pattern matches are identified (at 408). This identification may utilize a string comparison for an integer field, or fields, that should not be compared based on the access configuration. If the SQL query is requesting such a comparison, then it is flagged for an invalid field type comparison.

Lastly, early termination statements are identified (at 410). These early termination statements may take the form of an SQL comment used to break up commands, functions and/or identifiers, for example.

The output of the SQL constraint solving process is a tree that includes specific information about constraint violations, as identified above. This tree may be output in its raw form, or as a summary report as metadata to the SQL query (at 412). Alternatively, as discussed previously, remedial measures may be employed to reduce risk of an injection attack.

Figure 5A:
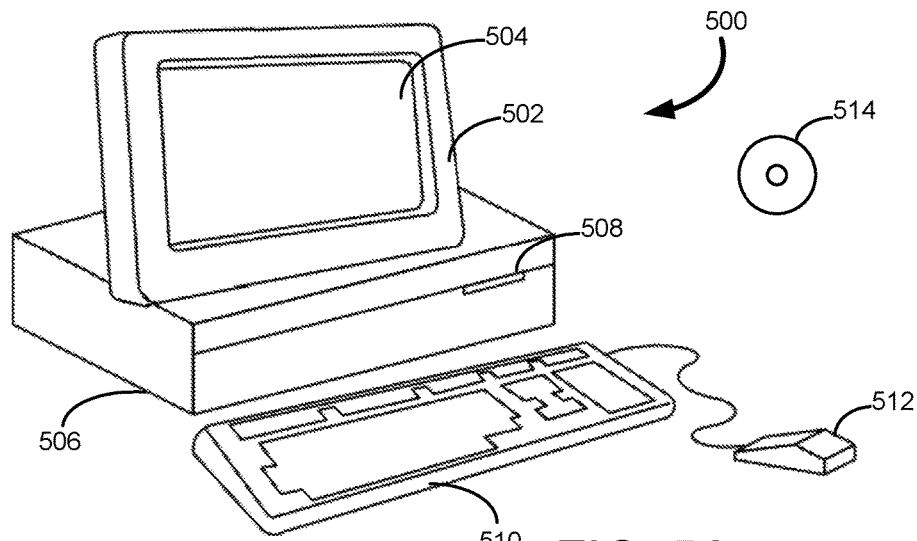
FIGS. 5A and 5B are example illustrations for computer systems configured capable of SQL query constraint solving, in accordance with some embodiments.
Figure 5B:
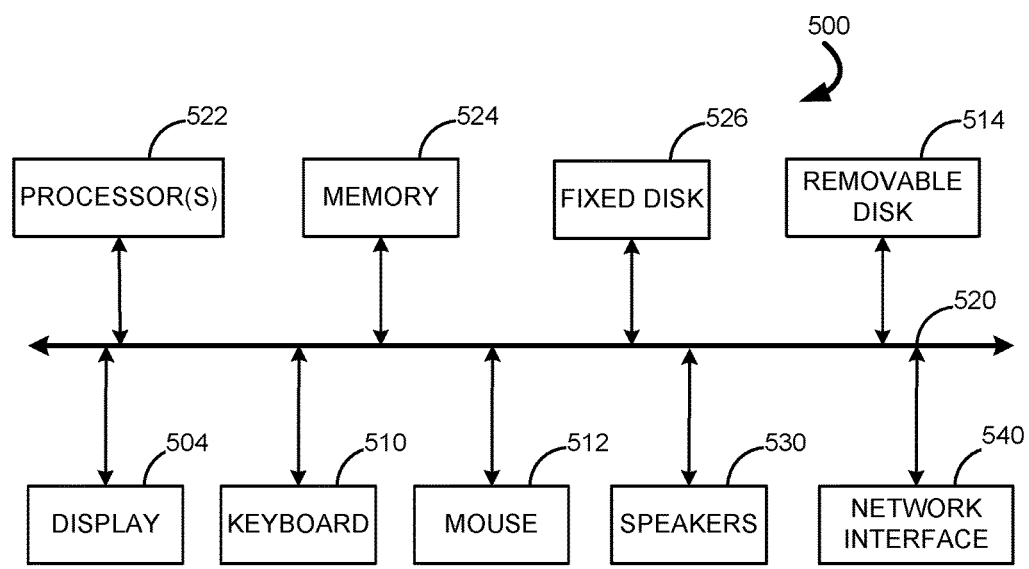

FIGS. 5A and 5B illustrate a Computer System 500, which is suitable for implementing embodiments of the present invention. FIG. 5A shows one possible physical form of the Computer System 500. Of course, the Computer System 500 may have many physical forms ranging from a printed circuit board, an integrated circuit, and a small handheld device up to a huge super computer. Computer system 500 may include a Monitor 502, a Display 504, a Housing 506, a Disk Drive 508, a Keyboard 510, and a Mouse 512. Disk 514 is a computer-readable medium used to transfer data to and from Computer System 500.

FIG. 5B is an example of a block diagram for Computer System 500. Attached to System Bus 520 are a wide variety of subsystems. Processor(s) 522 (also referred to as central processing units, or CPUs) are coupled to storage devices, including Memory 524. Memory 524 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A Fixed Disk 526 may also be coupled bi-directionally to the Processor 522; it provides additional data storage capacity and may also include any of the computer-readable media described below. Fixed Disk 526 may be used to store programs, data, and the like and is typically a secondary storage medium (such as a hard disk) that is slower than primary storage. It will be appreciated that the information retained within Fixed Disk 526 may, in appropriate cases, be incorporated in standard fashion as virtual memory in Memory 524. Removable Disk 514 may take the form of any of the computer-readable media described below.

Processor 522 is also coupled to a variety of input/output devices, such as Display 504, Keyboard 510, Mouse 512 and Speakers 530. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, motion sensors, brain wave readers, or other computers. Processor 522 optionally may be coupled to another computer or telecommunications network using Network Interface 540. With such a Network Interface 540, it is contemplated that the Processor 522 might receive information from the network, or might output information to the network in the course of performing the above-described SQL constraint solving.

Furthermore, method embodiments of the present invention may execute solely upon Processor 522 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as optical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter.

In sum, the present invention provides systems and methods for analyzing SQL queries for constraint violations, which may indicate injection attacks. Such systems and methods enable the identification and possibly prevention, of such attacks. This increases database security where employed.

A tautology-based attack is a type of SQL injection in which code is injected into in the SQL statement (SQL statement and SQL query are used synonymously hereinafter), causing the condition in the query to always evaluate to be true. Once the condition is satisfied due to the presence of a tautology, the query may execute to carry out the attack (such as, for example, extracting all columns or rows of a given database). Detecting tautology is a high priority in database attack prevention.

An example of a tautology-based attack is the injection of SQL code that compares two static values to generate an always-true condition for the "where" clause of the SQL statement. In other words, a tautology will cause the condition for accessing or exfiltrating the data to evaluate to be always true and thus allows the data to always be accessed or exfiltrated when the SQL statement executes. For example, the statement "Select * from users where 1=1" will always cause the condition, that is to say the comparison (1=1), to always evaluate to be true. Thus, this SQL statement will always cause all columns to be extracted from the database table "users."

Although tautology-based attacks are known, effective methods for detecting tautologies in SQL statements have been lacking. For example, pattern recognition has been attempted whereby the SQL statement is parsed in order to ascertain whether it contains a pattern of characters that represents a tautology. The problem with this approach is that by simply parsing and performing pattern recognition on the characters in the SQL statement without really understanding how the database engine would interpret the SQL statement, it's easy to generate a false positive. Another problem exists with respect to the difficulty of writing code to capture all possible instances of tautologies and to continuously update the code to ensure that new tautologies are detected.

White list is another approach to detecting tautology. The algorithm is trained to recognize queries that are legitimate, thereby forming a baseline "white list" of legitimate queries. After training, any query that does not appear in the white list will be flagged. White list training, however, is time consuming and also prone to producing false positives if the training is inadequate or if the query structure changes.

Parameterized query is an approach that attempts to rigidly define what the query must have and cannot have in its various fields. Once the parameterized query model is created, all applications must be written to conform to that parameterized model. Although parameterizing queries is a valid approach to preventing the injection of tautologies into SQL statements, it is expensive and time consuming to implement since existing legacy applications must be rewritten to conform to the parameterized query model.

Embodiments of the invention relate to methods and apparatus for detecting tautologies in SQL queries. As discussed earlier, the SQL query may be converted to a parse tree. The components of a parse tree are text strings, mathematical operators, parentheses, and other tokens that can be used to form valid expressions. These components are the building blocks for SQL requests, and they form the nodes and leaves of the parse tree. The generation of parse trees from SQL statements is known and will not be repeated here.

Taking the parse tree as an input, embodiments of the invention evaluate the parse tree for items that may be involved with and/or contribute to tautologies (defined as evaluating to be always true regardless of the database state) and/or contradictions (defined as evaluating to always be false regardless of the database state) and/or inefficient SQL coding. In this disclosure the term "evaluation flaw" covers tautologies, contradictions, and inefficient SQL coding, among others.

In one or more embodiments, there are provided methods for walking or evaluating step-wise through the parse tree to evaluate for types. If the query's condition hinges on dynamic (defined herein as being dependent on the data in the database) comparisons without any static (defined herein as being literal values or certain constant operations that are independent of the database content) comparison, no tautologies are deemed to exist in the SQL query. On the other hand, if the query's condition hinges on a static comparison, the SQL query is considered to be at risk of being infected with a tautology, or a contradiction or at least inefficiently formed. Alternatively or additionally, if the query's condition always evaluates to be a value or a type that is independent of the content of the database, always evaluates to be true or always evaluates to result in a static type, the SQL query is considered to be at risk of being infected with a tautology, or a contradiction or at least inefficiently formed. In any of these cases, attention should be paid to the SQL query. (*Note to inventors: Broad statement to support broad claims. The specifics are in the examples below*)

In other embodiments, if there are static comparisons, these static comparisons can be evaluated to obtain the result. The resulting value would definitively indicate whether a tautology or a contradiction exists in the SQL query.

By performed complex, tiered evaluations, it is possible to not only detect strict tautologies/contradictions but to also identify suspicious behavior as well as inefficiencies in a query structure. For example, if a static comparison is made every time, it is possible to optimize the query by rewriting the query to avoid performing the static comparison repeatedly.

Figure 6:
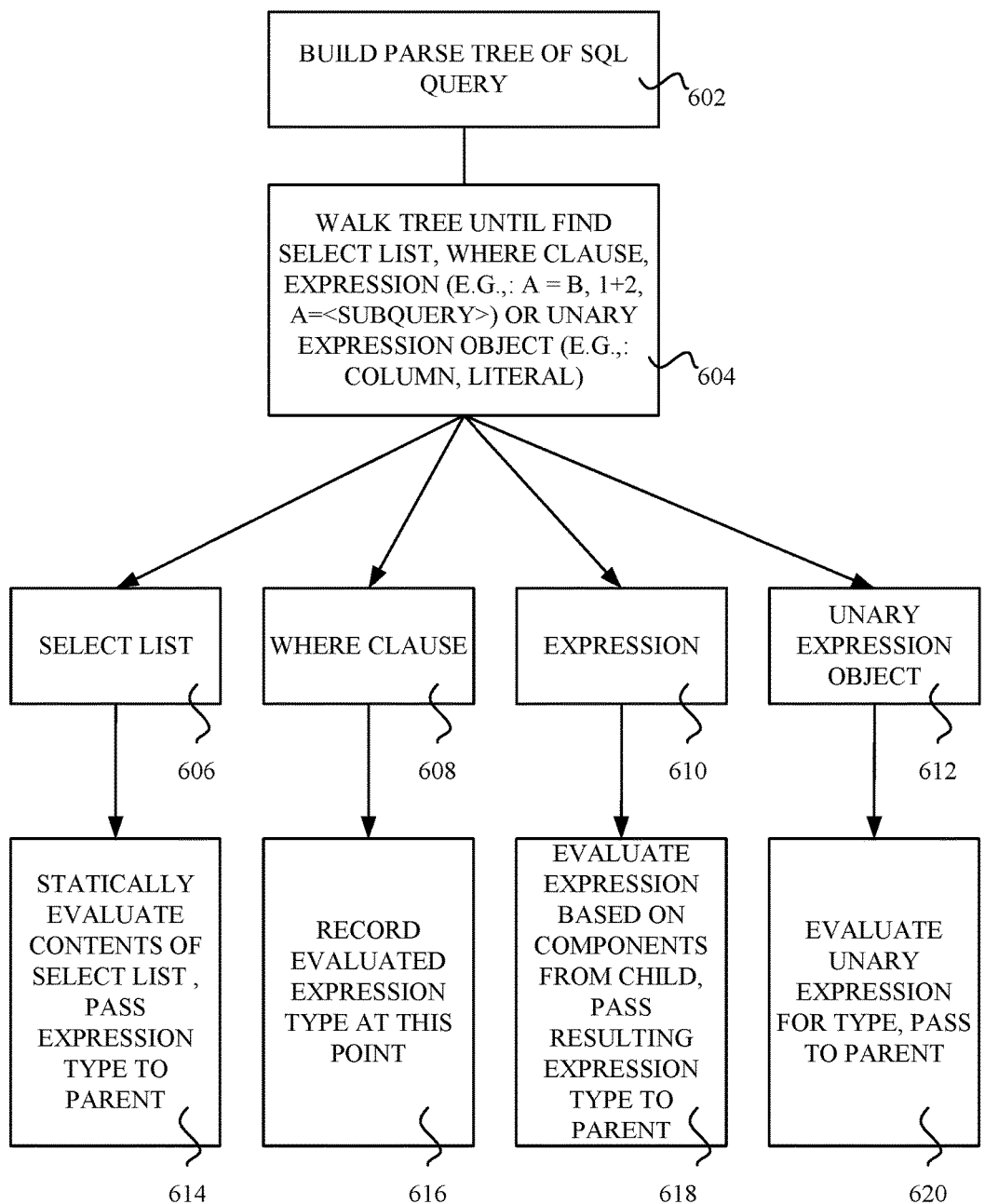
FIG. 6 shows, in accordance with an embodiment of the invention, a flow diagram for evaluating expression types via SQL parse tree reversal.

FIG. 6 shows, in accordance with an embodiment of the invention, a flow diagram for evaluating expression types via SQL parse tree reversal. Generally speaking, a depth-first (also known as bottom-up) methodology is employed to walk (i.e., evaluate step-wise) the parse tree (602) and find (604) all select lists (606), where clauses (608), expressions (610), and unary expression objects (612).

Generally speaking, select list is a SQL query component that determines what data will be returned by the query. Where clause includes a comparison predicate and is used to further restrict data to be returned by the query. Expression is the comparison predicate that is capable of evaluating to true or false. Generally speaking, the expression can be any mathematical operation, including a comparison. A sub-query can also be used in an expression. Unary expression objects are objects that cannot be further divided. Examples of unary expression objects include variables in the data base, a single column, literal values which may be expressed as boolean, decimal, hexadecimal, or as strings for example. These components are well known and will not be elaborated further herein. In the parse tree, these components are represented by nodes (606, 608, 610, and 612).

At the branch that contains select list (606), the method statically evaluates contents of the select list indicated and passes the express type of the contents up to the parent node for further evaluation, if needed (614). At the branch that contains unary expression objects (612), the method drills down to the unary expression and evaluates its type. The type evaluated will be passed up to the parent node in the parse tree for further evaluation (620). At the branch that contains expression (610), the method evaluates the expression based on component types passed up from its children (618). At the branch that contains the where clause (608), the method records the evaluated expression type (616), which evaluated expression type is obtained from evaluation of the expression (610). The process continues until the root node or a termination clause is encountered. The result of the evaluation is an expression type that represents the operation performed by the where clause of the SQL statement.

If the expression type is a dynamic comparison, no tautology is deemed to exist with respect to that where clause in the SQL query. As mentioned earlier, a dynamic comparison, in the context of the present invention, has its result dependent on the data in the database.

If the expression type is a static comparison, tautologies (defined as evaluating to be always true regardless of the database state), or contradictions (defined as evaluating to always be false regardless of the database state), or inefficiencies are deemed to possibly exist in the SQL query. In this case, the SQL query is flagged for investigation. Additionally or alternatively, the SQL query execution is halted to protect against possible or actual unauthorized exfiltration of data.

Figure 7A:
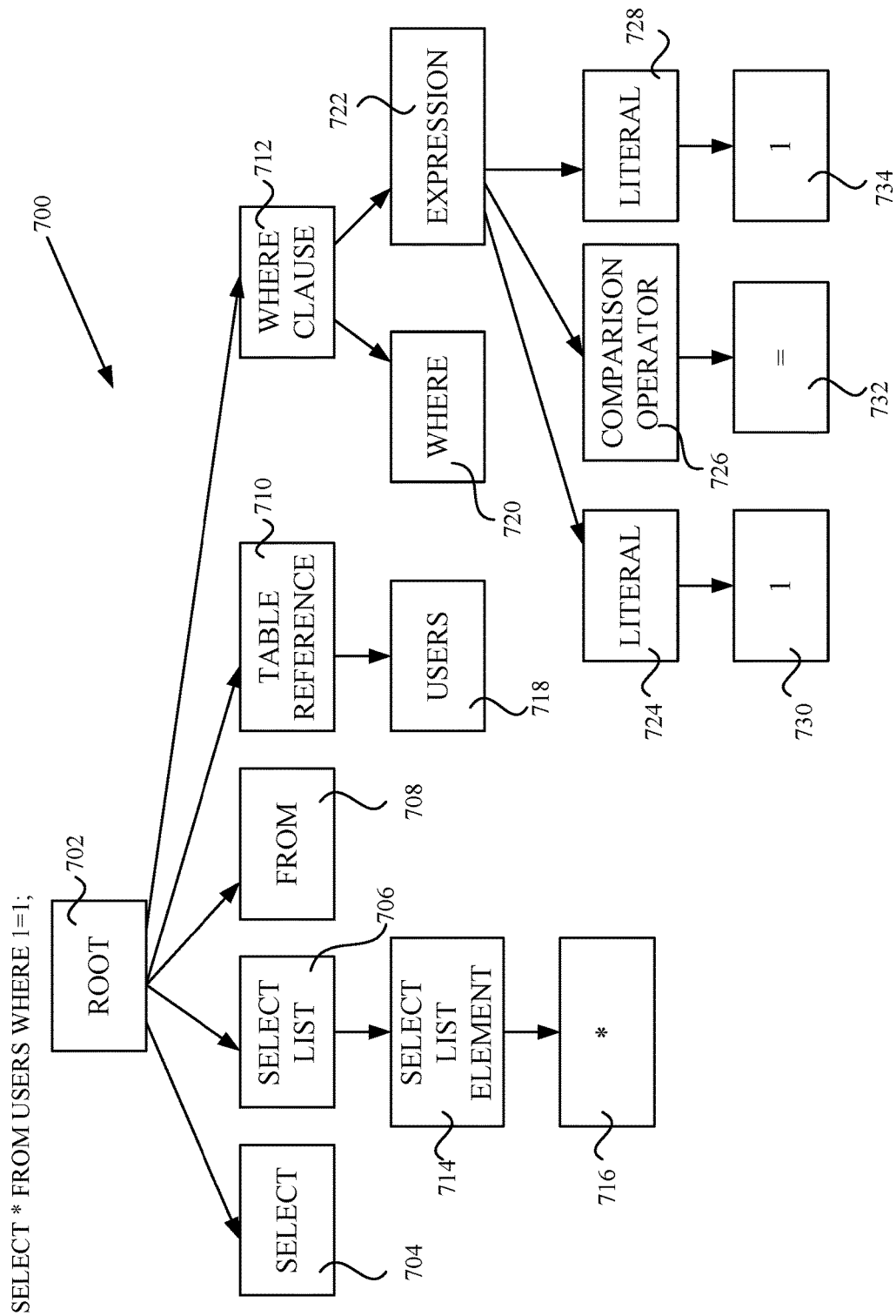
FIG. 7A is an example showing, in accordance with an embodiment of the present invention, how the method steps of FIG. 6 execute against a parse tree generated from an example SQL query.

FIG. 7A is an example showing how the method steps of FIG. 6 execute against a parse tree generated from the SQL query "SELECT * from users where 1=1". The parse tree of this SQL statement is shown as parse tree 700. Block 702 represents the root node. All the bottom leaves such as 704, 716, 708, 718, 720, 730, 732, and 734 form the original SQL query.

Figure 7B:
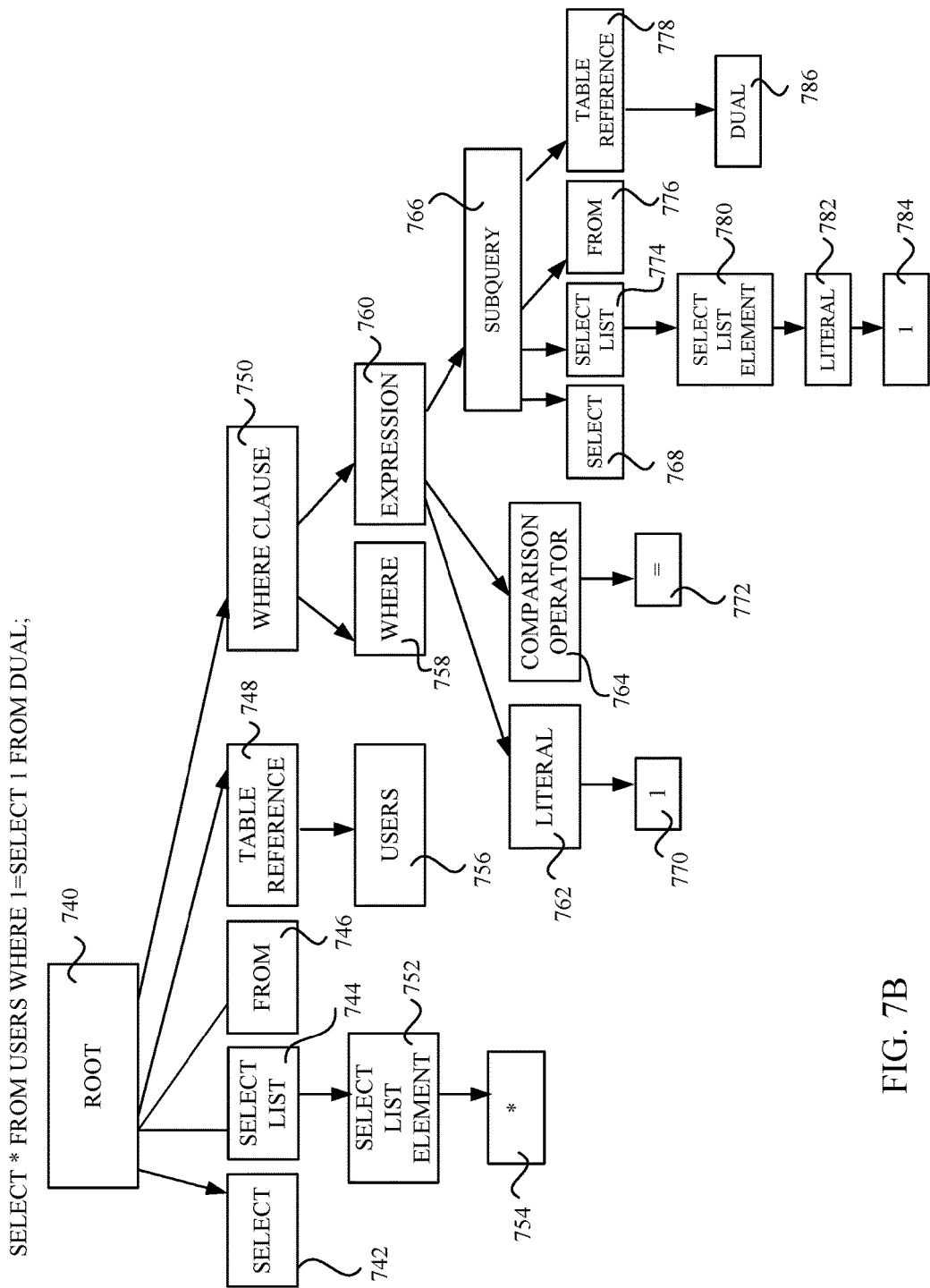
FIG. 7B shows, in accordance with an embodiment of the present invention, how the method steps of FIG. 6 execute against a parse tree generated from another example SQL query.

In block 704 the component SELECT is shown. Since this is neither a SELECT LIST nor a UNARY EXPRESSION object, this is ignored. Block 706 represents the SELECT LIST. The SELECT LIST ELEMENT (714) is shown to be "*" (716). The static type of this value (in this case, dynamic) is saved in case of a further evaluation against this type needs to be made. This may be the case if this SELECT LIST happens to be part of a SUB-QUERY, as would be the case in the example of FIG. 7B. FIG. 7B will be discussed later here in.

Block 708 represents the component from and is neither a SELECT LIST nor a UNARY EXPRESSION object so it is ignored. Table reference (710) refers to table "users" (718).

Under EXPRESSION 722, there are two LITERALS (724 and 728). The first LITERAL value (730) is "1". The second LITERAL value (734) is "1". The comparison operator (726) is the equal comparison operator (732).

Evaluation of LITERAL "1" results in a static type for each of blocks 730 and 732 since this value does not depend on the value of the database. These results are passed upstream to EXPRESSION block 722. EXPRESSION 722 therefore is a comparison between two static types, and this comparison is passed up to its parent node (WHERE CLAUSE 712). In this example, it turns out that the value of SELECT LIST "*" (716) is not needed since SELECT LIST 706 is not a child of any SUB-QUERY. The result of the evaluation of WHERE CLAUSE 712 (a static comparison) is passed up to root node 702. Since the result of the evaluation of the SQL query is a static comparison, it is deemed that a tautology, a contradiction, or at least a deficiency exists in the SQL query.

FIG. 7B shows a more complicated example wherein a SUB-QUERY (766) is present. The SQL query to be evaluated is "SELECT * from users where 1=SELECT 1 from dual" whereby "dual" is a specific database table.

Block 740 is the root node. Select block 742 is the SELECT component of the SQL statement. Select list (744) has SELECT LIST ELEMENT (752) and value "*" (754). As before, the type of the value "*" of block 754 is saved since it is not known at this point whether SELECT LIST 744 is a part of a SUB-QUERY. This is because the traversal method is bottom-up (depth first) and the method only has knowledge of the current node/branch under evaluation.

Block 746 "FROM" is a component of the SQL statement. Since it is neither a SELECT LIST nor a UNARY EXPRESSION type, it is ignored. Block 748 is the table reference, which includes the table identifier "users" (756).

WHERE CLAUSE 750 is a component of the SQL query and contains the component WHERE 758 and EXPRESSION 760. EXPRESSION 760 implements the expression "1=SELECT 1 from dual" and thus includes LITERAL 762 that has the value "1" (770). This value "1" (770) is evaluated for type, which turns out to be a static type, and the static type is saved.

Comparison operator 764 includes the comparator equal (772).

SUB-QUERY 766 represents the portion of the original SQL statement that is "select 1 from dual". Thus, there is shown a SELECT block 768 and a SELECT LIST 774, which contains SELECT LIST ELEMENT 780. In this case, SELECT LIST ELEMENT 780 is a LITERAL (782) with a value of "1" (784). Since this value "1" (784) is a UNARY EXPRESSION, it is evaluated for type, which happens to be a static type. This static type is passed up to its parent node (782/780/774/766) and makes its way up to EXPRESSION node 760.

FROM (block 776) is a component of the original SQL query. Table reference (778) includes the value "dual" (786). Since this is not a SELECT LIST or a UNARY EXPRESSION type, there is no need to save this type.

At EXPRESSION block 760, the entire expression "1=1" (770/772/784) is evaluated, and it is a static comparison. This static comparison is passed upstream to parent node 750 and is recorded in WHERE CLAUSE block 750. In this case, the result is a static comparison and thus there exists a possibility that a tautology, a contradiction, or inefficiency may exist with this SQL query.

Note that the type of the value "*" (754) is originally saved. However, this SELECT LIST 744 is not a part of any SUB-QUERY. Thus it turns out that the type of the value "*" does not need to be saved. However, since this is a bottom-up depth-first traversal algorithm, it is not possible to know in advance at the moment the value "*" (754) is evaluated for type whether SELECT 744 is a part of a SUB-QUERY. Since it is not possible to know, this type evaluation of the value (744) of SELECT LIST ELEMENT 752 is saved anyway.

Also note that the type evaluation for the LITERAL "1" (784/782) is also an element of SELECT LIST (774/780). Although it is not possible to know in advance at the moment the value "1" (784) is evaluated for type whether this SELECT LIST ELEMENT 780 is part of a SUB-QUERY, the saving of this type evaluation turns out to be useful since SELECT LIST 774 is part of SUB-QUERY 766. For this reason, the type evaluation for a SELECT LIST ELEMENT is saved just in case it turns out that the associated SELECT LIST ELEMENT is part of a SUB-QUERY.

The type evaluation result of WHERE CLAUSE 750 is passed up to root node 740. The evaluation result for this parse tree of FIG. 7B is another static comparison and thus, there exists a possibility that a tautology, a contradiction, or inefficiency may exist with this SQL query.

Note that because the structure of the SQL language and a parse tree structure are utilized, it is possible to evaluate and know what type SUB-QUERY 766 would evaluate to. In this case, the value (784) is evaluated to be "1" within this sub-query, which type is a static type. If the query structure was not available, and the traversal method of embodiments of the invention is not employed, it would not be possible to understand that the value of SUB-QUERY 766 is a "1" and the type of this SUB-QUERY 766 is static in order to allow the method to conclude that the entire SQL query is a static comparison. In other words, the SQL query is evaluated in the same way that the database would evaluate the SQL query for execution.

Figure 8A:
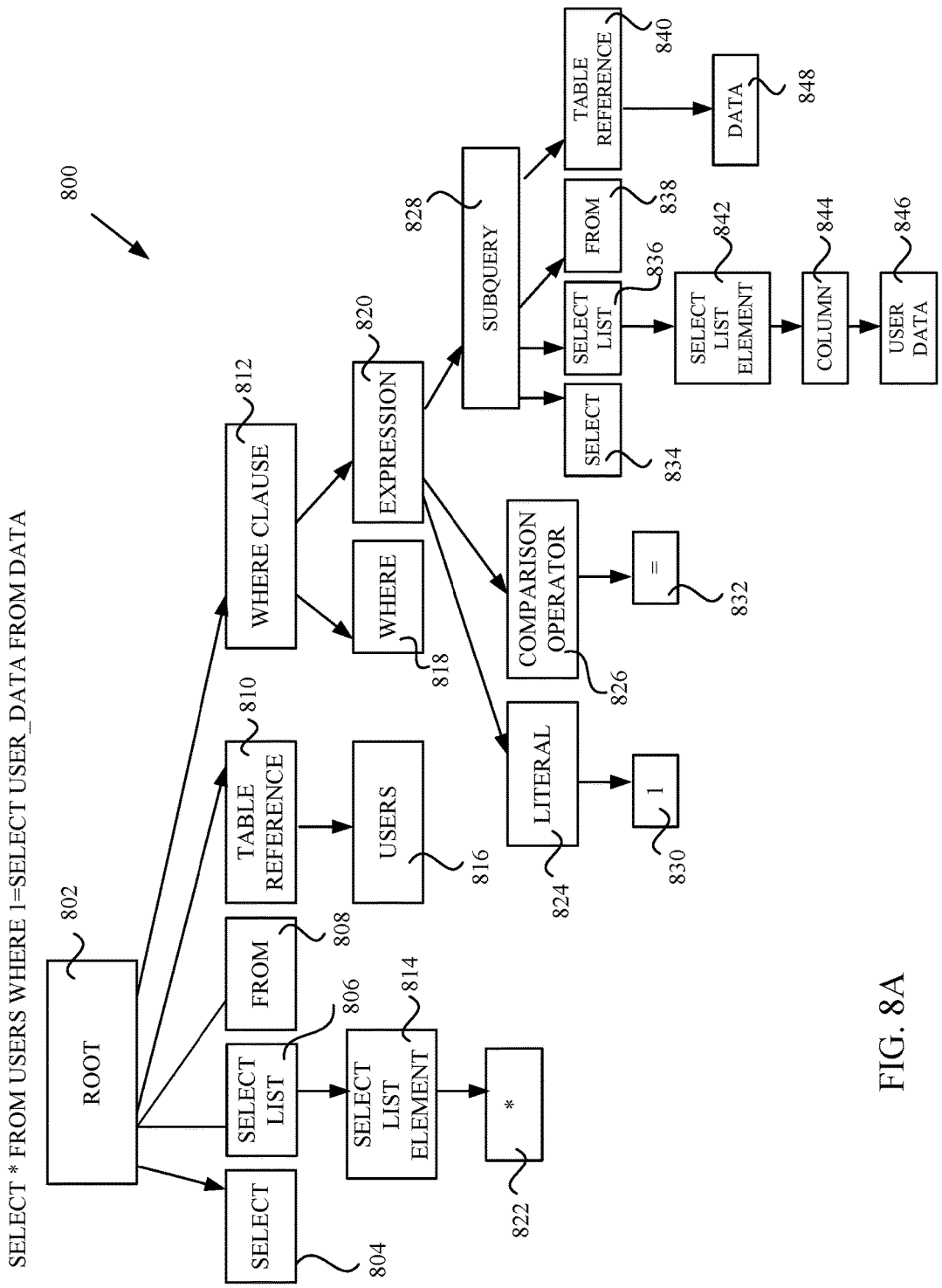
FIG. 8A shows, in accordance with an embodiment of the present invention, how the method steps of FIG. 6 execute against a parse tree generated from an example SQL query that involves a dynamic type comparison.

FIG. 8A is an example of a dynamic type comparison. The parse tree 800 of FIG. 8A implements the SQL query "SELECT * from users where 1=select user_data from data".

Block 802 is the root node. Block 804 is the SELECT component of the SQL statement. Block 806 is the SELECT LIST element that includes SELECT LIST ELEMENT 814, which in turn has the value "*" 822. Since this is part of SELECT LIST 806, the value "*" (822) is evaluated for type, which happens to be a dynamic type. This dynamic type is saved the since it is not known at this point in time whether SELECT LIST 806 is part of a SUB-QUERY.

Block 808 is component from of the SQL statement.

Block 810 is a table reference that has the value "users" 816. WHERE CLAUSE 812 consists of component WHERE 818 and EXPRESSION 820. This EXPRESSION 820 implements the phrase "select user_data from data".

There is shown a LITERAL block 824 with a value "1" (830), which evaluates to be a static type. Comparison operator at 826 has the equal operator (832).

Sub query 828 includes SELECT block 834, SELECT LIST 836 which has SELECT LIST ELEMENT 842, column 844, and the value "user_data" 846. Since user data 846 is part of SELECT LIST 836, it is evaluated for type, and it is a dynamic type. This dynamic type is passed up to parent (828/820).

Block 838 implements the expression FROM, which is part of the original SQL query. Table reference 840 includes the value database identifier "data" 848. The dynamic type evaluated from SELECT LIST 836/828 and from LITERAL 830/824 are passed to EXPRESSION 820, where this expression "1=SELECT user_data from data" is evaluated.

The evaluation returns the expression type to be a dynamic expression, which is recorded in WHERE CLAUSE 812. Again, the value and type of "*" 822 is not needed since SELECT LIST 806 is not part of a SUB-QUERY.

The evaluation results 812 is passed to root node 802. The evaluation of the SQL EXPRESSION of FIG. 8A turns out to be a dynamic type comparison, which is not indicative of a risk for tautology.

Figure 8B:
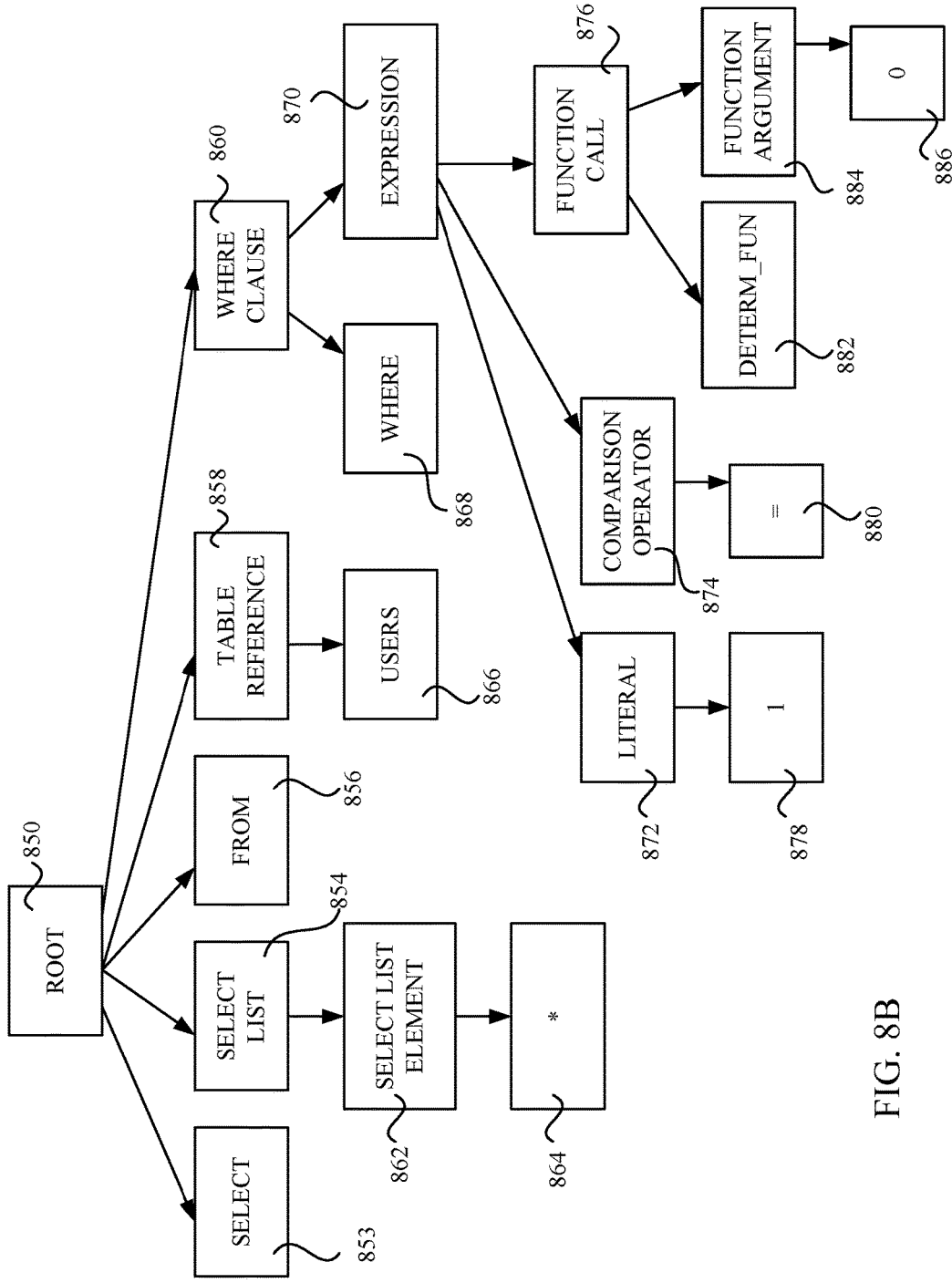
FIG. 8B shows, in accordance with an embodiment of the present invention, a more complicated example showing how the method steps of FIG. 6 execute against a parse tree generated from an example SQL query that involves a deterministic user defined function.

FIG. 8B is an example that involves a user defined function "determ_fun" that is deterministic. In FIG. 8B, the SQL query is "SELECT * from users where one=determ_fun (10)".

Root node 850 is shown in FIG. 8B. SELECT 852 implements the SELECT function of the original SQL statement.

Select list 854 includes SELECT LIST ELEMENT 862, which has the value "*" 864. Since we do not know at this time whether SELECT LIST 854 is a part of another SUB-QUERY, the type of "*" 864, which is dynamic, is stored.

Block 856 implements the component from out of the original SQL query.

Table reference 858 has the value "users" 866. WHERE CLAUSE 860 includes block 868 (WHERE) and EXPRESSION 870. EXPRESSION 870 implements the phrase "one=determ_fun (10)" of the original SQL statement. Thus, LITERAL 872 has the value "1" (878), which evaluates to be a static type. Comparison operator 874 includes comparator 880 "=".

The function call 876 includes the function identifier 882, which is determ_fun. Function argument 884 has the value of 10 (886). Since this is a deterministic function, and while it is not known what this function does, it is true that a deterministic function would return the same value for a given input every time. Accordingly, the type for determ_fun (10) would be static.

The static type would be passed up to EXPRESSION 870, where it is evaluated in a comparison against the static type out of LITERAL 872 and value "1" 878. This EXPRESSION in block 870 is evaluated to be a static comparison in WHERE CLAUSE 860. Again it turns out that the type for the value "*" stored in block 864 is not needed since SELECT LIST 854 is not part of a SUB-QUERY. The end result is that the static comparison is passed up to root node 850.

Since this is a static comparison, there exists a possibility that a tautology, a contradiction, or inefficiency exist with regard to the SQL statement of FIG. 8B.

Figure 9:
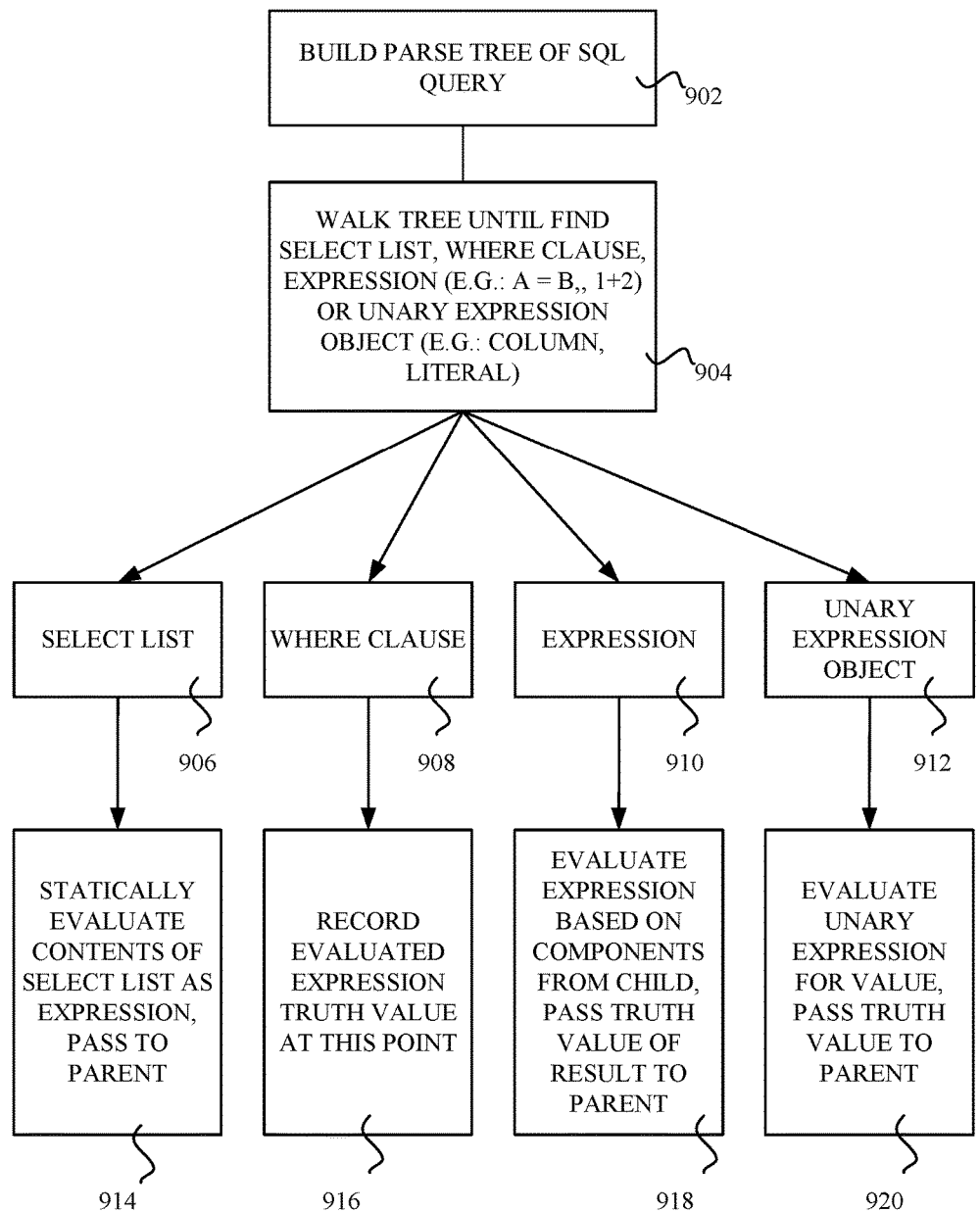
FIG. 9 shows, in accordance with an embodiment of the invention, a flow diagram for evaluating expression values via SQL parse tree reversal.

FIG. 9 shows, in accordance with an embodiment of the invention, a flow diagram for evaluating EXPRESSION values via SQL parse tree reversal. In contrast to FIG. 6 which evaluates for types, the steps of FIG. 9 evaluates for values. Evaluation for value is useful in situations where it is possible to statically evaluate an expression. This is the case where, for example, the expression involves known operation between static parts such as 1=1 or involves an annihilating operation between static and dynamic parts such as 0*x. The SQL parse tree can be evaluated in a bottom-up, depth-first fashion to determine whether the result at the where clause is a tautology (defined as evaluating to be always true regardless of the database state) or a contradiction (defined as evaluating to always be false regardless of the database state). In either case, the SQL query is flagged for investigation. Additionally or alternatively, the SQL query execution is halted to protect against possible or actual unauthorized exfiltration of data.

Generally speaking, a depth-first (also known as bottom-up) methodology is employed to walk (i.e., evaluate stepwise) the parse tree (902) and find (904) all SELECT LISTS (906), WHERE CLAUSES (908), EXPRESSIONS (910), and UNARY EXPRESSION objects (912).

At the branch that contains SELECT LIST (906), the method statically evaluates (914) contents of the SELECT LIST indicated and passes the value of the contents up to the parent node for further evaluation, if needed. At the branch that contains UNARY EXPRESSION objects (912), the method drills down (920) to the UNARY EXPRESSION and evaluates its value. The value evaluated will be passed up to the parent node in the parse tree for further evaluation. At the branch that contains EXPRESSION (910), the method evaluates (918) the EXPRESSION based on component values passed up from its children. At the branch that contains the WHERE CLAUSE (908), the method records (916) the evaluated EXPRESSION value, which evaluated EXPRESSION value is obtained from evaluation of the EXPRESSION (910). The process continues until the root node or a termination clause is encountered. The result of the evaluation is a value that represents the data returned by the WHERE CLAUSE of the SQL statement.

Figure 10A:
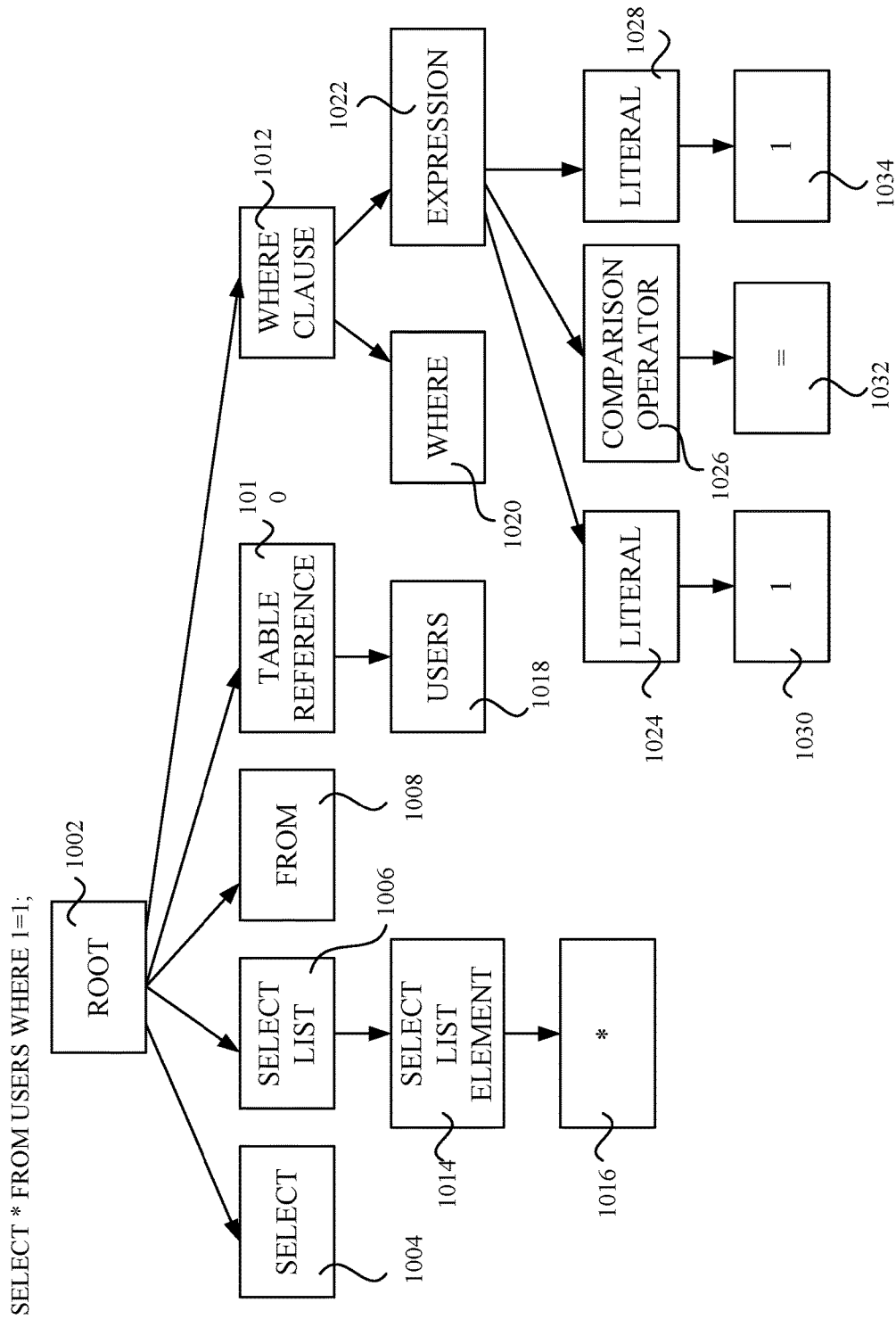
FIG. 10A shows, in accordance with an embodiment of the invention, how the method steps of FIG. 9 execute against a parse tree generated from an example SQL query.

FIG. 10A is an example showing how the method steps of FIG. 9 execute against a parse tree generated from the SQL query "select * from users where 1=1". The parse tree of this SQL statement is shown as parse tree 1000. Block 1002 represents the root node. All the bottom leaves such as 1004, 1016, 1008, 1018, 1020, 1030, 1032, and 1034 form the original SQL query.

Figure 10B:
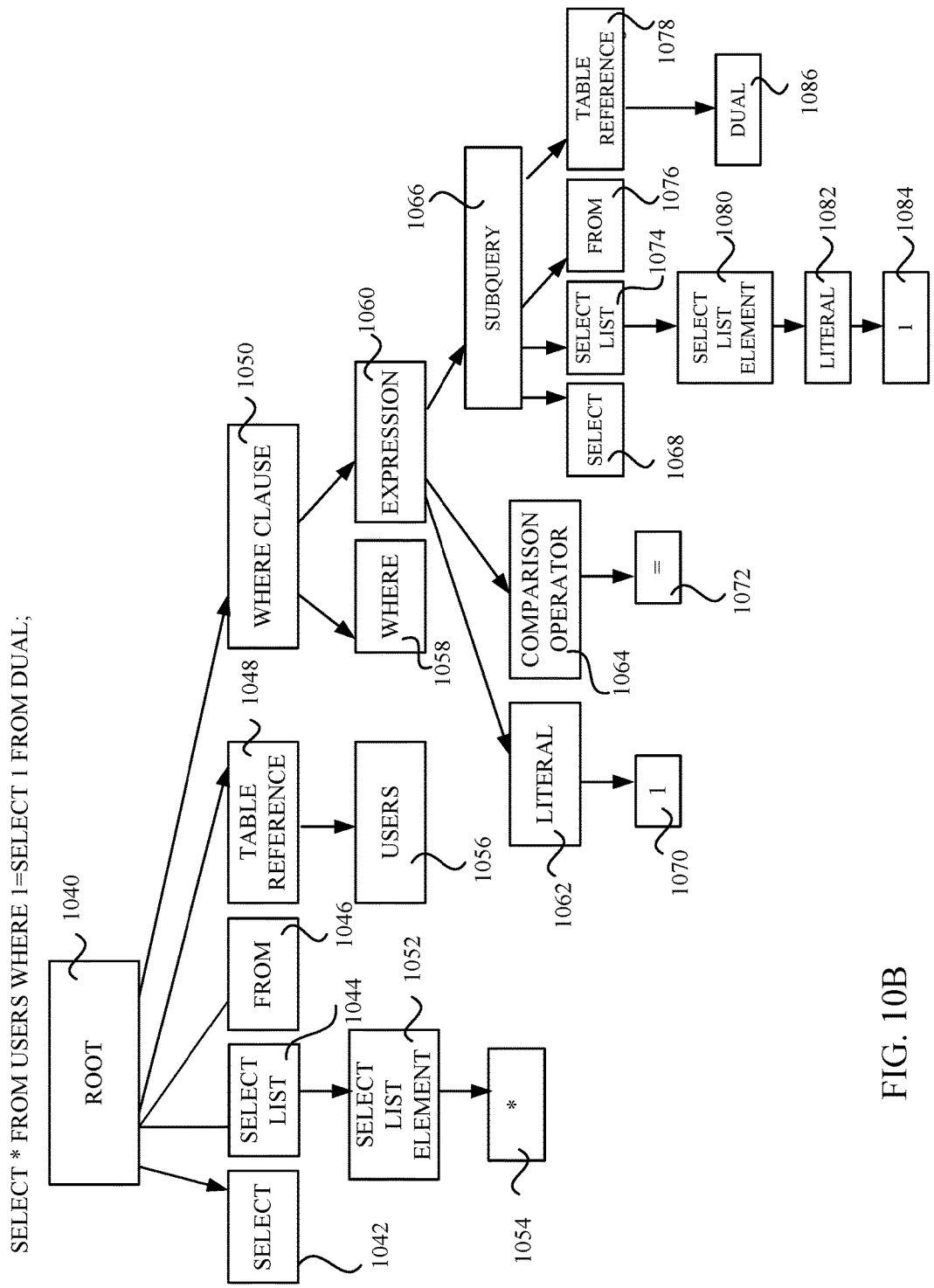
FIG. 10B shows, in accordance with an embodiment of the present invention, how the method steps of FIG. 9 execute against a parse tree generated from an example SQL query wherein a sub-query is present.

In block 1004 the component select is shown. Since this is neither a SELECT LIST nor a UNARY EXPRESSION object, this is ignored. Block 1006 represents the SELECT LIST. The SELECT LIST element (1014) is shown to be "*" (1016). This value is saved in case of a further evaluation against this value needs to be made. This may be the case if this SELECT LIST happens to be part of a sub-query, as would be the case in the example of FIG. 10B. FIG. 10B will be discussed later here in.

Block 1008 represents the component FROM and is neither a SELECT LIST nor a UNARY EXPRESSION object so it is ignored. Table reference (1010) refers to table "users" (1018).

Under EXPRESSION 1022, there are two LITERALS (1024 and 1028). The first LITERAL value (1030) is "1". The second LITERAL value (1034) is "1". The comparison operator (1026) is the equal comparison operator (1032).

Expression 1022 therefore is a comparison between two values, and this comparison result (true since 1=1) is passed up to its parent node (WHERE CLAUSE 1012). In this example, it turns out that the value of SELECT LIST "*" (1016) is not needed since SELECT LIST 1006 is not a child of any sub-query. The result of the evaluation of WHERE CLAUSE 1012 (true) is passed up to root node 1002. Since the result of the evaluation of the SQL query is always true, it is deemed that a tautology exists in the SQL query.

FIG. 10B shows a more complicated example wherein a sub-query (1066) is present. The SQL query to be evaluated is "select * from users where 1=select 1 from dual" whereby "dual" is a specific database table.

Block 1040 is the root node. SELECT block 1042 is the select component of the SQL statement. SELECT list (1044) has SELECT LIST element (1052) and value "*" (1054). As before, the value "*" of block 1054 is saved since it is not known at this point whether SELECT LIST 1044 is a part of a sub-query. This is because the traversal method is bottom-up (depth first) and the method only has knowledge of the current node/branch under evaluation.

Block 1046 "FROM" is a component of the SQL statement. Since it is neither a SELECT LIST nor a UNARY EXPRESSION, it is ignored. Block 1048 is the table reference, which includes the table identifier "users" (1056).

WHERE CLAUSE 1050 is a component of the SQL query and contains the component where 1058 and EXPRESSION 1060. Expression 1060 implements the expression "1=select 1 from dual" and thus includes LITERAL 1062 that has the value "1" (1070). This value "1" (1070) is saved.

Comparison operator 1064 includes the comparator equal (1072).

Sub query 1066 represents the portion of the original SQL statement that is "select 1 from dual". Thus, there is shown a select block 1068 and a SELECT LIST 1074, which contains SELECT LIST element 1080. In this case, SELECT LIST element 1080 is a LITERAL (1082) with a value of "1" (1084). This value is passed up to its parent node (1082/1080/10104/1066) and makes its way up to EXPRESSION node 1060.

From (block 1076) is a component of the original SQL query. Table reference (1078) includes the value "dual" (1086). Since this is not a SELECT LIST or a UNARY EXPRESSION, there is no need to save this value.

At EXPRESSION block 1060, the entire expression "1=1" (1070/1072/1084) is evaluated, and it is a static comparison with the result=true. This value is passed upstream to parent node 1050 and is recorded in WHERE CLAUSE block 1050. In this case, the result is an "always-true" value, and thus there exists a possibility that a tautology may exist with this SQL query. Note that if the result is "always false", it is deemed that a contradiction exists with this SQL query.

Note that because the structure of the SQL language and a parse tree structure are utilized, it is possible to evaluate and know what sub-query 1066 would evaluate to. In this case, the value (1084) is evaluated to be "1" with the sub-query. If the query structure was not available, and the traversal method of embodiments of the invention is not employed, it would not be possible to understand that the value of sub-query 1066 is a "1" in order to allow the method to conclude that the WHERE CLAUSE of the SQL statement evaluates to be always true. In other words, the SQL query is evaluated in the same way that the database would evaluate the SQL query for execution.

Figure 11:
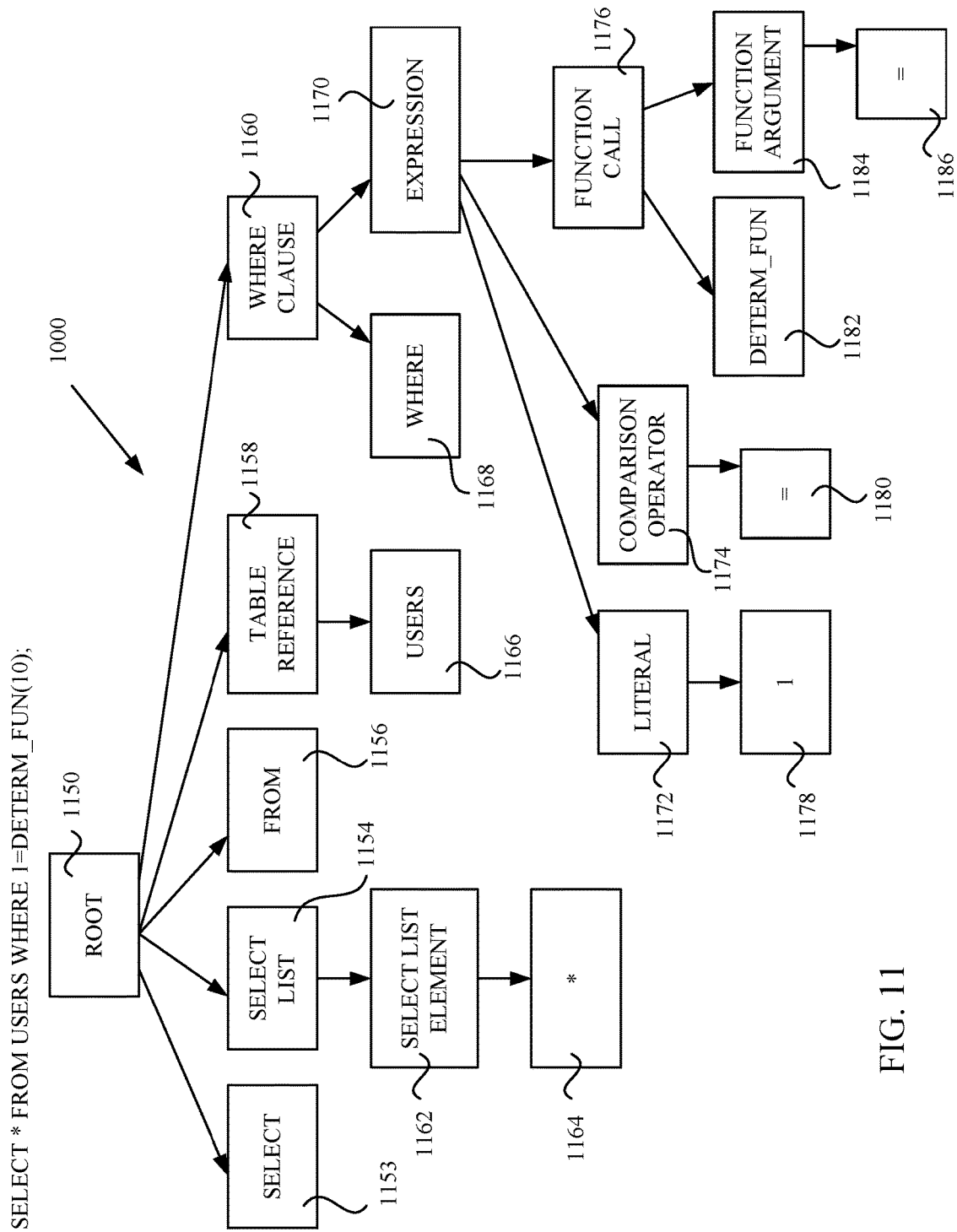
FIG. 11 shows, in accordance with an embodiment of the present invention, how the method steps of FIG. 9 execute against a parse tree generated from an example SQL query wherein a deterministic user defined function is present.

FIG. 11 is an example that involves a user defined function "determ_fun" that is deterministic. In FIG. 11, the SQL query is "select * from users where one=determ_fun (10)".

Root node 1150 is shown in FIG. 11. Select 1152 implements the SELECT function of the original SQL statement.

SELECT LIST 1154 includes SELECT LIST element 1162, which has the value "*" 1164. Since we do not know at this time whether SELECT LIST 1154 is a part of another sub-query, the value "*" 1164 is stored.

Block 1156 implements the component FROM out of the original SQL query.

Table reference 1176 has the value "users" 1166. WHERE CLAUSE 1160 includes block 1168 (WHERE) and EXPRESSION 1170. Expression 1170 implements the phrase "one=determ_fun (10)" of the original SQL statement. Thus, LITERAL 1172 has the value "1" (1178). Comparison operator 1174 includes comparator 1180 "=".

The function call 1176 includes the function identifier 118, which is determ_fun. Function argument 1184 has the value of 10 (1186). Since this is a deterministic function, and since it is not known what this function does, it is not possible to evaluate for its value.

FIG. 11 is thus an example where it is possible to evaluate for the type (see FIG. 8B) but not for the value. The ability to process for types is thus a powerful tool provided by embodiments of the invention. This fact also illustrates the utility and generality of the approach of evaluating for type to detect tautologies/contradictions/inefficiencies.

While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention.

It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. A method for detecting a tautology in a SQL query, said SQL query configured to access data in a database table, comprising:
    creating a parse tree from said SQL query;
    evaluating said parse tree to ascertain whether a condition of said SQL query is a type that is independent of contents of said database table by determining a type of a unary expression and passing the type up to a parent node in the parse tree for further evaluation based upon component types to determine an evaluated expression type, recording the evaluated expression type at a where clause; and
    when, responsive to said evaluating, said condition is found, designating said SQL query at risk for having said tautology in said SQL query,
    wherein said condition is deemed found when said SQL query involves a comparison between two static types, each of said two static types being independent of contents of said database table and at least one of said two static types being a deterministic function operating on a static type.

2. The method of claim 1, wherein said evaluating includes a bottom-up evaluation of said parse tree.

3. The method of claim 1, wherein said condition is a result of a comparison operation.

4. The method of claim 1, wherein said condition is deemed found when said SQL query involves a comparison between two static types, each of said two static types being independent of contents of said database table.

5. The method of claim 1, wherein said condition is deemed found when said SQL query involves an operation that always evaluates to be true irrespective of contents of said database table.

6. The method of claim 1, wherein said evaluating said parse tree further including storing a type of a select list element for subsequent expression evaluation.

7. The method of claim 6, further comprising performing said subsequent expression evaluation when said select list element is a part of a sub-query.

8. The method of claim 1, wherein said condition is deemed found when said SQL query involves a comparison between two literals.

9. A method for detecting a tautology in a SQL query, said SQL query configured to access data in a database table, comprising:
    creating a parse tree from said SQL query;
    evaluating step-wise, using a bottom-up methodology, through said parse tree to ascertain whether a condition of said SQL query results in a type that is independent of contents of said database table by determining a type of a unary expression and passing the type up to a parent node in the parse tree for further evaluation based upon component types to determine an evaluated expression type, recording the evaluated expression type at a where clause; and
    when said condition is found, responsive to said evaluating, designating said SQL query at risk for having said tautology in said SQL query,
    wherein said condition is deemed found when said SQL query involves a comparison between two static types, each of said two static types being independent of contents of said database table and at least one of said two static types being a deterministic function operating on a static type.

10. The method of claim 9, wherein said evaluating includes a bottom-up evaluation of said parse tree.

11. The method of claim 9, wherein said evaluating includes employing a comparison operation.

12. The method of claim 9, wherein said condition is deemed found when said SQL query involves a comparison between two static types, each of said two static types being independent of contents of said database table.

13. The method of claim 9, wherein said condition is deemed found when said SQL query involves an operation that always evaluates to be true irrespective of contents of said database table.

14. The method of claim 9, wherein said evaluating said parse tree further including storing a type of a select list element for subsequent expression evaluation.

15. The method of claim 14, further comprising performing said subsequent expression evaluation when said select list element is a part of a sub-query.

16. The method of claim 9, wherein said condition is deemed found when said SQL query involves a comparison between two literals.

17. A method for detecting a tautology in a SQL query, said SQL query configured to access data in a database table, comprising:
    creating a parse tree from said SQL query;
    evaluating step-wise, using a bottom-up methodology, through said parse tree said parse tree, including:
    evaluating a type of a unary expression object;
    passing the type up to a parent node in the parse tree for further evaluation based upon component types to determine an evaluated expression type;
    recording the evaluated expression type at a where clause;
    evaluating a condition for said data access, said condition employing said expression; and
    when said condition is satisfied independent of contents of said database table, designating said SQL query at risk for having said tautology in said SQL query,
    wherein said condition is deemed found when said SQL query involves a comparison between two static types, each of said two static types being independent of contents of said database table and at least one of said two static types being a deterministic function operating on a static type.

18. The method of claim 17, wherein said evaluating said expression includes evaluating a comparison operation.

19. The method of claim 17, wherein said condition is deemed found when said SQL query involves a comparison between two static types, each of said two static types being independent of contents of said database table.

* * * * *